United States Patent Office 3,394,123
Patented July 23, 1968

3,394,123
MONOAZO DYESTUFFS
Karl Ronco, Riehen, and Paul Hegner, Basel, Switzerland, assignors to Ciba Limited, Basel, Switzerland, a company of Switzerland
No Drawing. Continuation-in-part of application Ser. No. 309,876, Sept. 18, 1963. This application Feb. 15, 1966, Ser. No. 527,508
Claims priority, application Switzerland, Sept. 8, 1962, 11,430/62; Aug. 7, 1963, 9,773/63
8 Claims. (Cl. 260—203)

This is a continuation-in-part of our copending application Serial No. 309,876 filed September 18, 1963 and now abandoned.

The present invention provides carboxylic acid amide azo dyestuffs free from acidic groups imparting solubility in water that correspond to the formula (1)
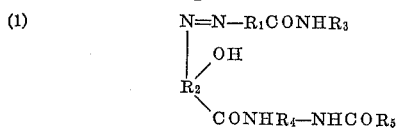

in which $R_1$ and $R_4$ represent phenylene radicals, $R_2$ represents a naphthalene radical in which the azo, hydroxyl and carboxylic acid amide groups are in 1-, 2- and 3-position respectively, $R_3$ represents an aryl radical free from aroylamino groups, for example, a pyrene, naphthalene or more especially a benzene radical, and $R_5$ represents a benzene radical that may be substituted.

Of special interest are dyestuffs of the formula (2)
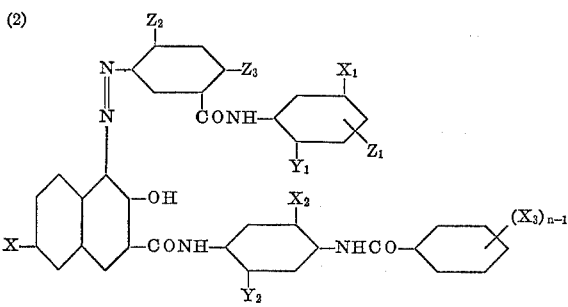

in which X represents a hydrogen atom or a halogen atom, or a lower alkoxy group, atom, $X_1$ represents a halogen atom or a trifluoromethyl group, $Y_1$ and $Z_1$ represent hydrogen or halogen atoms or trifluoromethyl groups, $Z_2$ represents a halogen atom or an alkyl group or more especially an alkoxy group, $Z_3$ represents a hydrogen or halogen atom, $X_2$ represents a halogen atom or an alkyl group, $Y_2$ represents a halogen atom or an alkyl or alkoxy group, $X_3$ represents a halogen atom or an alkyl or alkoxy group or a phenyl group, and $n$ represents an integer from 1 to 4.

The new dyestuffs are obtained when a carboxylic acid halide free from acidic groups imparting solubility in water and corresponding to the formula (3)
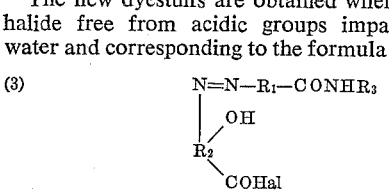

is condensed with a monoamine free from acidic groups imparting solubility in water and corresponding to the formula (4) $H_2N-R_4-NHCO-R_5$ in which formulae $R_1$ and $R_4$ represent phenylene groups, $R_2$ represents a naphthalene radical in which the azo, hydroxyl and carboxylic acid halide groups are in 1-, 2- and 3-position respectively, $R_3$ represents a benzene or naphthalene radical free from cyclic substituents, and $R_5$ represents a benzene radical.

The dyestuffs used as starting materials in the process of the invention must be free from acidic groups imparting solubility in water, especially sulfonic acid and carboxylic acid groups.

As azo dyestuff carboxylic acid chlorides there are advantageously used those of the formula (5)
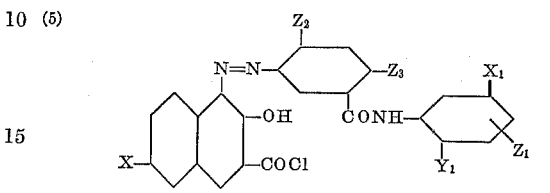

in which X represents a hydrogen or halogen atom, $X_1$ represents a halogen atom or a trifluoromethyl group, $Y_1$ and $Z_1$ represent hydrogen atoms, halogen atoms or trifluoromethyl groups, $Z_2$ represents a halogen atom or an alkyl group or more especially an alkoxy group and $Z_3$ represents a hydrogen atom or a halogen atom.

The azo dyestuff carboxylic acids from which the acid halides are prepared are obtained when the diazo compound of an aminocarboxylic acid arylide of the formula (6) 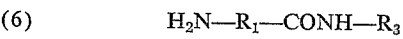

in which $R_1$ and $R_3$ have the meanings given above, are coupled with a 2:3-hydroxynaphthoic acid which may be substituted in the benzene ring free from the carboxylic acid group, for example, by a halogen atom, especially a bromine atom, in 6-position.

As examples of aminocarboxylic acids of the formula (6) there may be mentioned:

4-chloro-3-aminobenzoic acid-2':5'-dichloranilide,
4-chloro-3-aminobenzoic acid-3'-chloranilide,
4-chloro-3-aminobenzoic acid-2'-chloro-5'-trifluoromethylanilide,
4-chloro-3-aminobenzoic acid-3'-trifluoromethylanilide,
4-chloro-3-aminobenzoic acid-3':5'-bis-trifluoromethylanilide,
4-chloro-3-aminobenzoic acid-2':4':5'-trichloroanilide,
2:4-dichloro-3-aminobenzoic acid-2:5-dichloroanilide,
2:4-dichloro-3-aminobenzoic acid-3'-trifluoromethylanilide,
2:4-dichloro-3-aminobenzoic acid-3'-chloroanilide,
5-amino-4-methoxy-2-chlorobenzoic acid-3'-trifluoromethylanilide,
4-methyl-3-aminobenzoic acid-2':5'-dichloroanilide,
4-methyl-3-aminobenzoic acid-3'-trifluoromethylanilide,
4-methoxy-3-aminobenzoic acid-3'-chloroanilide,
4-methoxy-3-aminobenzoic acid-2':5'-dichloroanilide,
4-methoxy-3-aminobzenoic acid-2':4':5'trichloroanilide,
4-methoxy-3-aminobenzoic acid-3'-trifluoromethylanilide,
4-methoxy-3-aminobenzoic acid-3':5'-bis-trifluoromethylanilide,
4-methoxy-3-aminobenzoic acid-2'-chloro-5'-trifluoromethylanilide,
4-methoxy-3-aminobenzoic acid-2':5'-dimethoxy-4'-chloroanilide,
4-methoxy-3-aminobenzoic acid-2':5'-dimethyl-4'-chloroanilide,
4-methoxy-3-aminobenzoic acid-α-naphthylamide,
4-methoxy-3-aminobenzoic acid-β-naphthylamide and
4-methoxy-3-amnobenzoic acid-(5':8'-dichloro)-α-naphthylamide.

The azocarboxylic acids so obtained are treated with agents capable of converting carboxylic acids into their acid halides, for example, acid chlorides or bromides, especially with phosphorus halides such as phosphorus pentabromide or phosphorus trichloride or phosphorus pentachloride, phosphorus oxyhalides, and advantageously thionylchloride.

The treatment with such acid halogenating agents is advantageously carried out in an inert organic solvent such as a chlorobenzene, for example, mono- or di-chlorobenzene, toluene, xylene or nitrobenzene, toluene, xylene or nitrobenzene.

In the preparation of the carboxylic acid halides it is generally of advantage first to dry the azocarboxylic acids which are prepared in aqueous medium, or to free them from water by azeotropic distillation with an organic solvent. If desired, this azeotropic drying can be carried out immediately prior to the treatment with the acid halogenating agent.

The monoamines to be used in the process of the invention advantageously correspond to the formula (7) 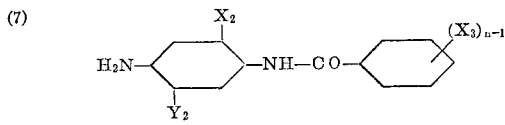

in which $X_2$ and $Y_2$ have the meanings given above, $X_3$ represents a halogen atom or an alkyl or a phenyl radical, and $n$ represents an integer not greater than 4. As example there may be mentioned:

4-benzoylamino-aniline,
4-(4'-chlorobenzoylamine)-aniline,
2:5-dichloro-4-benzoylaminoaniline,
2:5-dichloro-4-(4'-chlorobenzoylamino)-aniline,
2:5-dichloro-4-(2':4'-dichlorobenzoylamine)-aniline,
2:5-dichloro-4-(2':5'-dichlorobenzoylamino)-aniline,
2:5-dichloro-4-(4'-methylbenzoylamino)-aniline,
2:5-dichloro-4-(4'-phenylbenzoylamino)-aniline,
2:5-dimethyl-4-benzoylamineaniline,
2:5-dimethyl-4-(4'-chlorobenzoylamino)-aniline,
2:5-dimethyl-4-(2':4'-dichlorobenzoylamino)-aniline,
2:5-dimethyl-4-(2':5'-dichlorobenzoylamine)-aniline,
2:5-dimethyl-4-(4'-methylbenzoylamino)-aniline,
2:5-dimethyl-4-(4'-phenylbenzoylamino)-aniline,
2:5-dimethyl-4-(4'-methoxybenzoylamino)-aniline,
2-chloro-5-methyl-4-benzoylaminoaniline,
2-chloro-5-methyl-4-(4'-chlorobenzylamino)-aniline,
2-chloro-5-methyl-4-(2':5'-dichlorobenzoylamine)-aniline,
2-chloro-5-methyl-4-(4'-methylbenzoylamino)-aniline,
2-chloro-5-methyl-4-(4'-phenylbenzoylamino)-aniline,
2-methoxy-5-chloro-4-benzoylaminoaniline,
2-methoxy-5-chloro-4-(4'-chlorobenzoylamino)-aniline,
2-methoxy-5-chloro-4-(2':5'-dichlorobenzoylamino)-aniline,
2-methoxy-5-chloro-4-(4'-methylbenzoylamino)-aniline and
2-methoxy-5-chloro-4-(4'-phenylbenzoylamine)-aniline.

The condensation between the carboxylic acid halides defined above and the amines is advantageously carried out in anhydrous medium. Under these conditions the condensation generally proceeds surprisingly easily, even at temperatures within the boiling range of the common organic solvents such as toluene, monochlorobenzene, dichlorobenzene, trichlorobenzene, nitrobenzene and the like. In order to accelerate the reaction it is generally of advantage to use an agent capable of binding acid, for example, anhydrous sodium acetate or pyridine. Some of the dyestuffs obtained are crystalline and some are amorphous, and they are generally obtained in a very good yield and in pure form. It is advantageous first to isolate the acid chlorides obtained but in some cases, however, this can be omitted without harm, and the condensation can be carried out immediately after the preparation of the carboxylic acid chlorides.

The dyestuffs of the invention can be obtained by a modification of the present process according to which the diazo compound of an amine of the formula $$N_2H—R_1—CONHR_3$$

is coupled with a compound of the formula

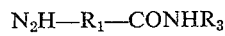
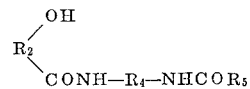

in which formulae $R_1, R_2, R_3, R_4$ and $R_5$ have the meanings given above. The coupling is advantageously carried out in such a manner that an acid solution of the diazonium salt is continuously added to an alkaline solution of the coupling component in a mixing nozzle whereby immediate coupling of the components takes place. Care should be taken to ensure that the diazo component and the coupling component are present in the mixing nozzle in equimolecular proportions. The simplest method of achieving this is by controlling the pH value of the liquid in the mixing nozzle. Provision should also be made for a vigorous turbulent motion of the two solutions in the mixing nozzle. The resulting dyestuff dispersion is removed continuously from the mixing nozzle and the dyestuff is separated by filtration.

In a further modification of the present process, the new dyestuffs are obtained by coupling the diazo compound of an amine of the formula (8)   $$H_2N—R_1—CONH—R_3$$

with a compound of the formula (9) 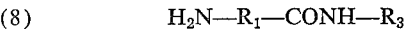
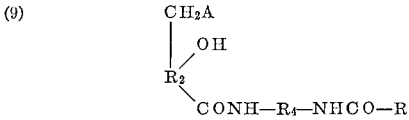

in which formulae A represents the residue of an amine, $R_1$ and $R_4$ represent phenylene groups, $R_2$ represents a naphthalene radical in which the azo, hydroxyl and carboxylic acid amide groups are in 1-, 2- and 3- position respectively, $R_3$ represents a benzene or naphthalene radical free from cyclic substituents and $R_5$ represents a benzene radical.

In the compounds of the formula (9), A advantageously represents the radical of an amine of the formula

(10) 

in which $R_6$ represents a hydrogen atom or an alkyl radical and $R_7$ represents an alkyl radical or the radicals $R_6$ and $R_7$ form a heterocyclic ring together with the nitrogen atom. As examples there may be mentioned the radicals of methylamine, dimethylamine, diethylamine, diethanolamine, pyrrolidine, piperidine and morpholine. The compounds of the formula (9) can be obtained by reacting compounds of the formula

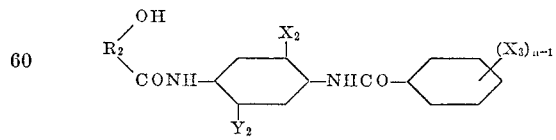

in which $R_2$, $X_2$, $Y_2$, $X_3$ and $n$ have the meanings given above, with formaldehyde and a primary or secondary amine.

The radical —$CH_2A$ is split off during coupling and is replaced by the azo group. Coupling is advantageously carried out in an acid medium.

The new dyestuffs are valuable pigments that can be used for a wide variety of purposes, for example, they can be used in a finely divided form for the spin dyeing of rayon and viscose, cellulose ethers or esters, polyamides, polyurethanes or polyesters; for the manufacture of colored lacquers or lakes; for coloring solutions or products of cellulose acetate, nitrocellulose, natural or synthetic resins such as polymerization or condensation resins, for example, aminoplasts, alkyd resins, phenoplasts, polyolefines such as polystyrene, polyvinyl chloride, polyethylene, polypropylene, polyacrylonitrile, rubber, casein, silicone and silicone resins, They can also be used in the manufacture of colored pencils, cosmetic preparations and laminated sheet material.

Compared with the dyestuffs described in German specification No. 1,146,604, which differ from the dyestuffs of the invention in that they contain a 2-hydroxy-3-naphthoic acid-acetylamido-anilide radical instead of a 2 - hydroxy - 3 - naphtholic acid benzoylamino-anilide radical, the dyestuffs of the invention exhibit a substantially better fastness to light.

The following examples illustrate the invention. Unless otherwise stated, the parts and percentages are by weight.

EXAMPLE 1

103 parts of the dyestuff obtained by diazotizing 4-chloro - 3-aminobenzoic acid-(2':5'-dichloro)-anilide in aqueous hydrochloric acid solution, in glacial acetic acid or with nitrosylsulfuric acid and coupling with 2:3-hydroxynaphthoic acid were heated for 3 hours at 120 to 125° C., while stirring, with 3000 parts of ortho-dichlorobenzene, 5 parts of dimethylformamide and 34 parts of thionyl chloride. After cooling the reaction mixture, the monocarboxylic acid chloride of the dyestuff, which precipitated in the form of thin, bent needles, was isolated by filtration, washed with a small amount of ortho-dihclorobenzene and benezene and then dried in vacuo at 50 to 60° C.

A mixture comprising 10.7 parts of the chloride so obtained, 5.3 parts of 2:5-dimethyl-4-benzoylamino-aniline and 300 parts of orthodichlorobenzene was heated for 14 hours at 140 to 145° C. The crystalline, sparingly soluble pigment was then filtered while hot, washed with hot ortho-dichlorobenzene, boiling alcohol and hot water, and then dried in vacuo at 70 to 80° C.

The dyestuff of the formula

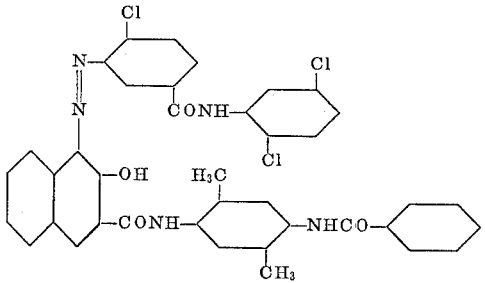

was a red pigment sparingly soluble to insoluble in the common solvents and colored polyvinyl chloride foils bright red tints possessing an excellent fastness to light and to migration.

The azo dyestuff mono-carboxylic acids obtained from the binuclear diazo components listed in column I of the following table and the coupling components listed in column II can be reacted in a manner analogous to that described in the first and second paragraphs via the monoazo dyestuff monocarboxylic acid chlorides with one mol of the aromatic bi-nuclear monoamines listed in column III. In column IV are listed the tints of polyvinyl chloride foils colored with the pigments.

TABLE I

| | I | II | III | IV |
|---|---|---|---|---|
| 1 | 4-chloro-3-aminobenzoic acid-(2':5-dichloro)-anilide. | 2:3-hydroxy-naphthoic acid | 2'5-dichloro-4-benzoylamino-aniline | Scarlet. |
| 2 | do | do | 2:5-dichloro-4-(2':5'-dichloro)-benzoylamino aniline. | Red. |
| 3 | do | do | 2:5-dimethyl-4-(4'-chloro)-benzoylamino-aniline. | Red. |
| 4 | do | do | 2-methoxy-5-chloro-4-benzoylaminoaniline | Scarlet. |
| 5 | do | do | 2-chloro-5-methyl-4-benzoylaminoaniline | Red. |
| 6 | do | do | 2:5-dimethyl-4-(4'-phenyl)-benzoylamino-aniline. | Red. |
| 7 | 4-chloro-3-aminobenzoic acid-(3'-trifluoromethyl)anilide. | 2:3-hydroxy-naphthoic acid | 2:5-dichloro-4-benzoylaminoaniline | Scarlet. |
| 8 | do | do | 2:5-dimethyl-4-benzoylaminoaniline | Red. |
| 9 | 5-amino-2:4,dichlorobenzoic acid (3'-trifluoromethyl)-anilide. | do | 2:5-dimethyl-4-(4'-chloro)benzoylamino-aniline. | Red. |
| 10 | do | do | 2:5-dichloro-4-(4'-chloro)benzoylamino-aniline. | Red. |
| 11 | 4-methoxy-3-aminobenzoic acid-(3-trifluoromethyl)anilide. | do | 2:5-dimethyl-4-benzoylaminobenzoylamino-aniline. | Bluish red. |
| 12 | do | do | 2:5-dimethyl-4-(4'-chloro)benzoylamino-aniline. | Do. |
| 13 | do | do | 2:5-dimethyl-4-(2':4'-dichloro)-benzoylaminoaniline. | Do. |
| 14 | do | do | 2:5-dichloro-4-(4'-chloro)benzoylamino-aniline. | Do. |
| 15 | do | do | 2:5-dimethyl-4-(4'-phenyl)benzoylamino-aniline. | Do. |
| 16 | do | do | 2-chloro-5-methyl-4-benzoylaminoaniline | Do. |
| 17 | do | do | 2-methoxy-5-chloro-4-benzoylaminoaniline | Do. |
| 18 | 4-methoxy-3-aminobenzoic acid-(3':5'-ditrifluoromethyl)-anilide. | do | 2:5-dichloro-4-benzoylaminoaniline | Do. |
| 19 | do | do | 2:5-dichloro-4-(4'-chloro)-benzoylamino-aniline. | Do. |
| 20 | do | do | 2:5-dimethyl-4-benzoylaminoaniline | Do. |
| 21 | do | do | 2-methoxy-5-chloro-4-benzoylaminoaniline | Do. |
| 22 | 4-methoxy-3-aminobenzoic acid-(2'-chloro-5'-trifluoromethyl)-anilide. | do | 2:5-dichloro-4-benzoylaminoaniline | Do. |
| 23 | do | do | 2:5-dimethyl-4-benzoylaminoaniline | Do. |
| 24 | do | do | 2-methoxy-5-chloro-4-benzoylaminoaniline | Do. |
| 25 | do | do | 2-chloro-5-methyl-4-benzoylaminoaniline | Do. |
| 26 | 4-methoxy-3-aminobenzoic acid-(2'-5'-dichloro)-anilide. | do | 2:5-dichloro-4-benzoylaminoaniline | Do. |
| 27 | do | do | 2:5,dichloro-4-(4'-chloro)-benzoylaminoaniline. | Do. |
| 28 | do | do | 2:5-dimethyl-4-benzoylaminoaniline | Do. |
| 29 | do | do | 2-methoxy-5-chloro-4-benzoylaminoaniline | Do. |
| 30 | do | do | 2:5-dichloro-4-(4'-phenyl)-benzoylaminoaniline. | Do. |
| 31 | do | do | 2:5-dichloro-4-(4'-methyl)-benzoylamino-aniline. | Do. |
| 32 | do | do | 2:5-dimethyl-4-(4'-methoxy)-benzoylamino-aniline. | Do. |
| 33 | do | do | 2-chloro-5-methyl-4-benzoylaminoaniline | Do. |
| 34 | do | do | 2:5,dimethyl-4-(4'-chloro)-benzoylamino-aniline. | Do. |
| 35 | 4-methoxy-3-aminobenzoic acid-(2':5'-trichloro)-anilide. | do | do | Do. |
| 36 | do | do | 2:5-dichloro-4-benzoylaminoaniline | Do. |

TABLE I—Continued

| | I | II | III | IV |
|---|---|---|---|---|
| 37 | ____do____ | ____do____ | 2:5-dichloro-4-(4'-chloro)-benzoylaminoaniline. | Do. |
| 38 | ____do____ | ____do____ | 2:5-dimethyl-4-benzoylaminoaniline | Do. |
| 39 | ____do____ | ____do____ | 2-methoxy-5-chloro-4-benzoylamonaniline | Do. |
| 40 | ____do____ | ____do____ | 2-chloro-5-methyl-4-benzoylaminoaniline | Do. |
| 41 | ____do____ | ____do____ | 2:5-dimethyl-4-(4'-methoxy)-benzoylaminoaniline. | Bluish. |
| 42 | 4-methoxy-3-aminobenzoic acid-3(3'-trifluoromethyl)-anilide. | 6-bromo-2:3-hydroxynaphthoic acid | 2:5-dimethyl-4-benzoylaminoaniline | Red violet. |
| 43 | ____do____ | ____do____ | 2:5,dimethyl-4-(4'-chloro)-benzoylaminoaniline. | Do. |
| 44 | 4-methoxy-3-aminobenzoic acid-(3'-trifluoromethyl)-aniline. | ____do____ | 2:5-dichloro-4-(4'-chloro)benzoylaminoaniline. | Do. |
| 45 | 4-methoxy-3-aminobenzoic acid-(2':4-dimethoxy-5'-chloro)-anilide. | 2:3-hydroxynaphthoic acid | ____do____ | Bluish red. |
| 46 | 4-methoxy-3-aminobenzoic acid-(2':5-dimethoxy-4'-chloro)-anilide. | ____do____ | 2:5-dimethyl-4-(4'-chloro)-benzoylaminoaniline. | Do. |
| 47 | ____do____ | ____do____ | 2:5-dimethyl-4-benzoylaminoaniline | Do. |
| 48 | ____do____ | ____do____ | 2:5-dichloro-4-benzoylaminoaniline | Do. |
| 49 | ____do____ | ____do____ | 2:5-dichloro-4-(4'-chloro)-benzoylaminoaniline. | Do. |
| 50 | 5-amino-4-methoxy-2-chlorobenzoic acid-(3'-trifluoromethyl)-anilide. | ____do____ | 2:5-dimethyl-4-benzoylaminoaniline | Do. |
| 51 | ____do____ | ____do____ | 2:5-dimethyl-4-(4'-chloro)-benzoylaminoaniline. | Do. |
| 52 | 4-methyl-3-aminobenzoic acid-(3'-trifluoromethyl)-anilide. | ____do____ | 2:5-dimethyl-4-benzoylaminoaniline | Do. |
| 53 | ____do____ | ____do____ | 2:5-dimethyl-4-(4'-chloro)-benzoylaminoaniline. | Do. |
| 54 | ____do____ | ____do____ | 2-methoxy-5-chloro-4-benzoylaminoaniline | Do. |
| 55 | 4-methoxy-3-aminobenzoic acid-(2':5'-dimethyl-4'-chloro)-anilide. | ____do____ | 2:5-dimethyl-4-benzoylaminoaniline | Do. |
| 56 | 4-methoxy-3-aminobenzoic acid-α-napthylamine. | ____do____ | ____do____ | Do. |
| 57 | 4-ethoxy-3-aminobenzoic acid-(3'-trifluoromethyl)-anilide. | ____do____ | ____do____ | Do. |
| 58 | 4-methoxy-3-aminobenzoic acid-(3'-trifluoromethyl)-anilide. | ____do____ | 2:5-diethyl-4-benzoylaminoaniline | Do. |
| 59 | 4-(4'-chloro)-phenoxy-3-aminobenzoic acid-(2'':5''-dichloroanilide). | ____do____ | 2:5-dichloro-4-benzoylaminoaniline | Red. |
| 60 | ____do____ | ____do____ | 2:5-dimethyl-4-benzoylaminoaniline | Red. |
| 61 | ____do____ | ____do____ | 2-methoxy-5-chloro-4-benzoylaminoaniline | Red. |
| 62 | 4-(4'-chloro)-phenoxy-3-aminobenzoic acid-(2'':4'':5'-trichloroanilide). | ____do____ | 2:5-dimethyl-4-benzoylaminoaniline | Red. |
| 63 | 4-phenoxy-3-aminobenzoic acid-(2'':5''-dichloroanilide). | ____do____ | ____do____ | Red. |
| 64 | 4-chloro-3-aminobenzoic acid-(3'-trifluoromethyl)-anilide. | ____do____ | 2:5-dichloro-4-(4'-chloro)-benzoylaminoaniline. | Scarlet. |
| 65 | ____do____ | ____do____ | ____do____ | Red. |
| 66 | ____do____ | ____do____ | 2-methoxy-5-chloro-4-benzoylaminoaniline | Scarlet. |
| 67 | 5-amino-2:4-dichloro-benzoic acid-(3'-trifluoromethyl)-anilide. | ____do____ | 2:5-dimethyl-4-benzoylaminoaniline | Red. |
| 68 | 4-bromo-3-amino-benzoic acid-(3'-trifluoromethyl)-anilide. | ____do____ | 2:5-dimethyl-4-(4'-chloro)-benzoylaminoanilide. | Red. |
| 69 | 4-bromo-3-aminobenzoic acid-(2':5'-dichloro)-anilide. | ____do____ | 2:5-dichloro-4-benzoylaminoaniline | Scarlet. |
| 70 | ____do____ | ____do____ | 2:5-dimethyl-4-benzoylaminoaniline | Red. |
| 71 | ____do____ | ____do____ | 2:5-dimethyl-4-(4'-chloro)benzoylaminoaniline. | Red. |
| 72 | 4-methyl-3-aminobenzoic acid-(2':5'-dichloro)-anilide. | ____do____ | 2:5-dimethyl-4-benzoylaminoaniline | Scarlet. |
| 73 | ____do____ | ____do____ | 2:5-demethyl-4-(4'-chloro)-benzoylaminoaniline. | Red. |
| 74 | ____do____ | ____do____ | 2:5-dimethyl-4-(4'-phenyl)-benzoylaminoaniline. | Red. |
| 75 | 4-methyl-3-aminobenzoic acid-(2'-methoxy-5'-chloro)-anilide. | ____do____ | 2:5-dimethyl-4-(4'-chloro)-benzoylaminoaniline. | Red. |
| 76 | ____do____ | ____do____ | 2:5-dimethyl-4-benzoylaminoaniline | Red. |
| 77 | ____do____ | ____do____ | 2:5-dimethyl-4-(4'-phenyl)-benzoylaminoaniline. | Red. |
| 78 | 4-methyl-3-aminobenzoic acid-(2'-carbomethoxy-5'-chloro)-anilide. | ____do____ | 2:5-dimethyl-4-(4'-chloro)-benzoylaminoaniline. | Red. |
| 79 | 4-methyl-3-aminobenzoic acid-(2':4':5'-trichloro)-anilide. | ____do____ | 2:5-dichloro-4-(4'-chloro)-benzoylaminoaniline. | Red. |
| 80 | ____do____ | ____do____ | 2:5-dimethyl-4-(4'-chloro)-benzoylaminoaniline. | Red. |
| 81 | ____do____ | ____do____ | 2:5-dimethyl-4-(4'-phenyl)-benzoylaminoaniline. | Red. |
| 82 | 4-methyl-3-aminobenzoic acid-(3'-trifluoromethyl)-anilide. | ____do____ | 2:5-dimethyl-4-benzoylaminoaniline | Red. |
| 83 | ____do____ | ____do____ | 2-methoxy-5-chloro-4-benzoylaminoaniline | Red. |
| 84 | 4-methoxy-3-aminobenzoic acid-(3'-trifluoromethyl anilide. | ____do____ | Monobenzoyl-p-phenylenediamine | Bluish red. |
| 85 | 4-ethoxy-3-aminobenzoic acid-(3'-trifluoromethyl. | ____do____ | ____do____ | Do. |
| 86 | 4-methoxy-3-aminobenzoic acid-(3'-trifluoromethyl anilide. | ____do____ | 4-(4'-chloro)-benzoylamino-aniline | Do. |
| 87 | 4-methyl-3-aminobenzoic acid-(2'-chloro-5'-trifluoromethyl)-anilide. | ____do____ | Monobenzoyl-p-phenylenediamine | Red. |
| 88 | 4-chloro-3-aminobenzoic acid-(3'-trifluoromethyl)-anilide. | ____do____ | 4-(4'-chloro)-benzoylaminoaniline | Red. |
| 89 | ____do____ | ____do____ | 4-(4'-methoxy)-benzoylaminoaniline | Orange. |
| 90 | 4-chloro-3-aminobenzoic acid-(3'-trifluoromethyl)-anilide. | ____do____ | 4-(4'-phenyl)-benzoylaminoaniline | Red. |
| 91 | ____do____ | ____do____ | 4-(4'-methyl)-benzoylaminoaniline | Scarlet. |
| 92 | ____do____ | ____do____ | 4-(4'-carbomethoxy-benzoylamino-aniline | Orange. |
| 93 | 4-methoxy-3-amonibenzoic acid-(2'-chloro-5'-trifluoromethyl)-anilide. | ____do____ | Monobenzoyl-p-phenylenediamine | Bluish red. |
| 94 | ____do____ | ____do____ | 4-(4'-methyl)-benzoylaminoaniline | Do. |
| 95 | 4-methyl-3-aminobenzoic acid-(3',5'-ditrifluoromethyl)-aniline. | ____do____ | Monobenzoyl-p-phenylenediamine | Do. |
| 96 | 4-methyl-3-aminobenzoic acid-(2',4',5'-trichloro)-anilide. | ____do____ | 4-(4'-phenyl)-benzoylaminoaniline | Red. |
| 97 | 4-methyl-3-aminobenzoic acid-(3'-trifluoromethyl)-anilide. | ____do____ | Monobenzoyl-p-phenylenediamine | Red. |
| 98 | ____do____ | ____do____ | 4-(4'-methoxy)-benzoylaminoaniline | Red. |
| 99 | ____do____ | ____do____ | 4-(4'-chloro)-benzoylaminoaniline | Red. |

TABLE I—Continued

| | I | II | III | IV |
|---|---|---|---|---|
| 100 | 4-methyl-3-aminobenzoic acid-(5'-chloro-2-methoxy)-anilide. | do | Monobenzoyl-p-phenylenediamine. | Red. |
| 101 | 4-methoxy-3-aminobenzoic acid-(3'-trifluoromethyl)-anilide. | do | 2,5-dimethoxy-4-(4'-chloro)-benzoylaminoaniline. | Bluish red. |
| 102 | 4-methyl-3-aminobenzoic acid-(5'-carbomethoxy-2'-chloro)-anilide. | do | do | Red. |
| 103 | 4-methoxy-3-aminobenzoic acid-(3'-trifluoromethyl)-anilide. | do | 4-benzoylamino-3-methylaniline. | Bluish red. |
| 104 | do | do | 2,5-dimethoxy-4-(4'-acetylamino)-benzoylaminoaniline. | Do. |
| 105 | do | do | 4-(4'-phenyl)-benzoylamino-3-methoxyaniline. | Do. |
| 106 | do | do | 5-methyl-2-methoxy-4-benzoylaminoaniline. | Do. |
| 107 | do | do | 2,5-dichloro-4-(2',4'-dimethyl)-benzoylaminoaniline. | Do. |
| 108 | 4-chloro-3-aminobenzoic acid-(2'-5'-dichloro)-anilide. | do | 4-(4'-methoxy)benzoylamino-2-methoxyaniline. | Scarlet. |
| 109 | do | do | 2,5-dimethoxy-4-(4'-chloro)-benzoylaminoaniline. | Do. |
| 110 | do | do | 4-benzoylamino-2-methylaniline. | Do. |
| 111 | 4-chloro-3-aminobenzoic acid-(3'-chloro)-anilide. | do | 2,5-dichloro-4-benzoylaminoaniline. | Red. |
| 112 | 4-methoxy-3-aminobenzoic acid-(3'-trifluoromethyl)-anilide. | do | 2-methyl-4-(4'-methoxy)-benzoylaminoaniline. | Red. |
| 113 | 4-methoxy-3-aminobenzoic acid-(3'-carbomethoxy)-anilide. | do | 2-methoxy-5-chloro-4-benzoylaminoaniline. | Bluish red. |
| 114 | 4-6-dichloro-3-aminobenzoic acid-(2',4'-dichloro)-anilide. | do | Monobenzoyl-p-phenylenediamine. | Scarlet. |
| 115 | 4-methoxy-3-aminobenzoic acid-(3'-trifluoromethyl)-anilide. | do | 3-methyl-4-benzoylaminoaniline. | Bluish red. |
| 116 | 4-chloro-3-aminobenzoic acid-(2',5'-dichloro)-anilide. | do | 2-methoxy-4-(4'-methoxy)-benzoylaminoaniline. | Scarlet. |
| 117 | 4-methylmercapto-3-aminobenzoic acid-(3'-trifluoromethyl)-anilide. | do | Monobenzoyl-p-phenylenediamine. | Bluish red. |
| 118 | do | do | 2,5-dimethyl-4-benzoylaminoaniline. | Do. |
| 119 | do | do | 2,5-dimethyl-4-(4'-phenyl)-benzoyl-aminoaniline. | Do. |
| 120 | 4-(4'-chloro)-phenoxy-3-aminobenzoic acid-(2',5'-dichloro)-anilide. | do | 2,5-dimethyl-4-benzoylaminoanilide. | Red. |
| 121 | 4-(4'-chloro)-phenoxy-3-aminobenzoic acid-(3'-trifluoromethyl)-anilide. | do | Monobenzoyl-p-phenylenediamine. | Scarlet. |
| 122 | 4-chloro-3-aminobenzoic acid-(2',4'-dichloro)-anilide. | do | do | Do. |
| 123 | do | do | 4-(4'-chloro-benzoylaminoaniline. | Orange. |
| 124 | 4-methyl-3-aminobenzoic acid-(2',4'-dichloro)-anilide. | do | Monobenzoyl-p-phenylenediamine. | Red. |
| 125 | 4-chloro-3-aminobenzoic acid-(2',4'-dichloro)-anilide. | do | 2,5-dimethyl-4-benzoylaminoaniline. | Red. |
| 126 | 4-methyl-3-aminobenzoic acid-(3'-trifluoromethyl)-anilide. | do | 4-(4'-methyl)-benzoylaminoaniline. | Red. |
| 127 | 4-chloro-3-aminobenzoic acid-(3'-trifluoromethyl)-anilide. | do | 4-(4'-carbomethoxy)-benzoylaminoaniline. | Orange. |
| 128 | 4-chloro-3-aminobenzoic acid-(2',5'-dichloro)-anilide. | do | 4-(4'-phenyl)-benzoylaminoaniline. | Red. |

EXAMPLE 2

11.8 parts of 4-methoxy-3-aminobenzoic acid-(3'-trifluoromethyl)-anilide were suspended in 100 parts of glacial acetic acid, 12 parts of 30% hydrochloric acid were added to the suspension and diazotisation was carried out at 0 to 5° C. with 11.2 parts of 4 N sodium nitrite solution. After 30 minutes, the mixture was diluted with 150 parts of ice water, filtered, and the clear diazo solution added to a solution of 17 parts of 1-dimethylaminomethyl - 2 - hydroxy - 3 - naphthoic acid - (4'-benzoylamino-2':5'-dimethyl)-phenylamide in 1500 parts of water and 22 parts of 2 N hydrochloric acid at 10 to 15° C. The mixture was then buffered to a pH-value of 4.5 to 5 with sodium acetate solution and stirred for 14 hours at 10 to 20° C. After suction filtration and washing with water, the filter cake was suspended in 110 parts of 5 N hydrochloric acid, the suspension stirred for 1 hour at room temperature, filtered, and the filter residue washed with dilute hydrochloric acid and water. The pigment was treated for 2 hours on a boiling water bath with 300 parts of pyridine, filtered while hot, washed with pyridine, ethanol and hot water and then dried in vacuo at 70 to 80° C. A dark red, soft-grained-powder was obtained which was very sparingly soluble in organic solvents and, when worked into polyvinyl chloride foils, produced a brilliant bluish red tint possessing a very good fastness to migration and to light.

The pigment so obtained, which corresponded to No. 12 of the Table I, had the following formula

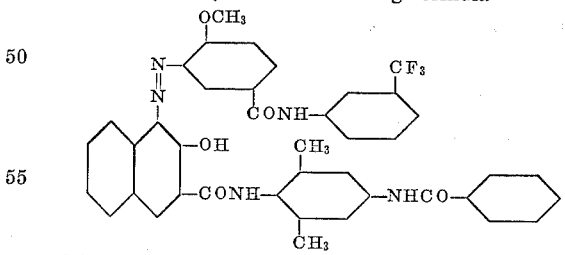

The diazo components listed in column I of the following Table II can be diazotised and coupled with the Mannich bases listed in column II in a manner analogous to that described in the first paragraph. In column III are listed the tints of polyvinylchloride foils colored with the pigments.

TABLE II

| | I | II | III |
|---|---|---|---|
| 1 | 4-methoxy-3-aminobenzoic acid-(3'-trifluoromethyl)-anilide. | 1-dimethylaminomethyl-2-hydroxy-3-naphthoic acid-(4'-benzoylamino-2':5'-dichloro)-phenyl-amide. | Bluish red. |
| 2 | 4-methoxy-3-aminobenzoic acid-(2'-chloro-5'-trifluoromethyl)-anilide. | do | Do. |
| 3 | 4-methoxy-3-aminobenzoic acid-(2':5'-dichloro)-anilide. | do | Do. |

EXAMPLE 3

23.3 parts of 4-methoxy-3-aminobenzoic acid-(3'-trifluoromethylanilide) were dissolved in 45 parts of warm glacial acetic acid, the solution so obtained was allowed to run into a solution of 30 parts of 30% hydrochloric acid, while stirring, and the mixture diazotised at 0 to 5° C. with 20 parts of 4 N sodium nitrite solution and then filtered until clear.

32.3 parts of 2-hydroxy-3-naphthoic acid-(4'-benzoylamino-2':5'-dimethylphenyl)-amide were dissolved in a cold mixture comprising 80 parts of ethyleneglycol monoethyl ether and 66 parts of 30% sodium hydroxide solution. The two solutions, if necessary diluted with water, were conveyed continuously to a mixing nozzle, where immediate coupling of the components took place. The pH-value in the mixing nozzle was kept between 5 and 6 by regulating the supply of the solutions and the temperature was held between 35 and 40° C. This could be regulated by the addition of water to the solutions of the components. The resulting dyestuff suspension was filtered and the filter residue, after washing, was stirred in a mixture comprising 20 parts of water, 110 parts of ethyleneglycol monoethyl ether and 100 parts of orthodichlorobenzene, and the whole then filtered. The filter residue was washed successively with ethyleneglycol monoethyl ether and methanol and then dried in vacuo at 70 to 80° C. The dyestuff, which was obtained in almost quantitative yield, corresponded in respect of tint, purity, fine state of division and fastness properties, to the product obtained in accordance with Example 1 (dyestuff No. 12 of Table I). The dyestuff is obtained in a particularly good state of fine division when the solution of the diazo component or of the coupling component contains an anionic or nonionic wetting agent, for example, the sodium salt of N-benzyl-μ-heptadecylbenzimidazole-disulfonic acid.

What is claimed is:
1. An azo-dyestuff of the formula

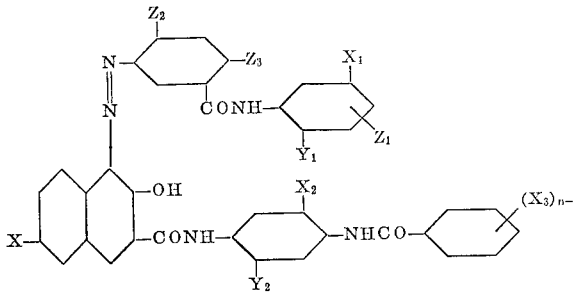

in which X represents a member selected from the group consisting of hydrogen and bromine, $X_1$ a member selected from the group consisting of chlorine and trifluoromethyl, $Y_1$ and $Z_1$ members selected from the group consisting of hydrogen, chlorine and trifluoromethyl, $Z_2$ a member selected from the group consisting of chlorine, lower alkyl, lower alkoxy, and lower alkylmercapto $Z_3$ a member selected from the group consisting of hydrogen and chlorine, $X_2$ and $Y_2$ are members selected from the group consisting of hydrogen chlorine, lower alkyl, and lower alkoxy $X_3$ a member selected from the group consisting of chlorine, lower alkyl, lower alkoxy, lower carbalkoxy, lower alkanoylamino and phenyl, and $n$ is a whole number from 1 to 3.

2. The dyestuff as claimed in claim 1 of the formula

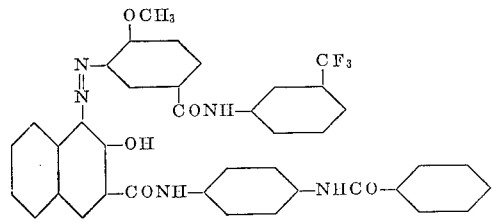

3. The dyestuff as claimed in claim 1 of the formula

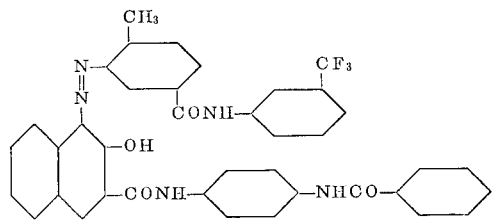

4. The dyestuff as claimed in claim 1 of the formula

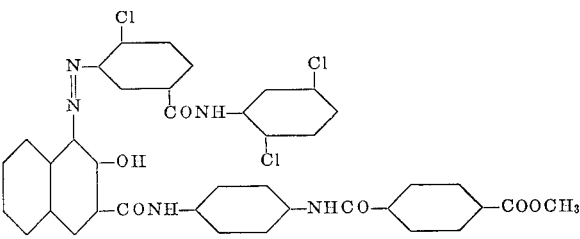

5. The dyestuff as claimed in claim 1 of the formula

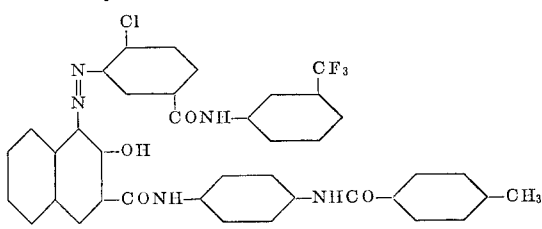

6. The dye stuff as claimed in claim 1 of the formula

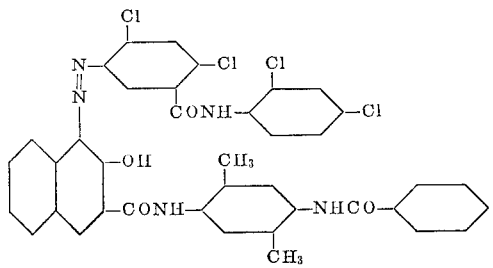

7. The dyestuff as claimed in claim 1 of the formula

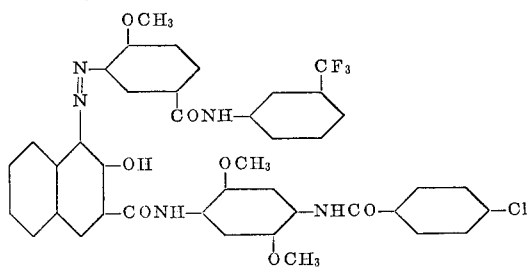

8. The dyestuff as claimed in claim 1 of the formula

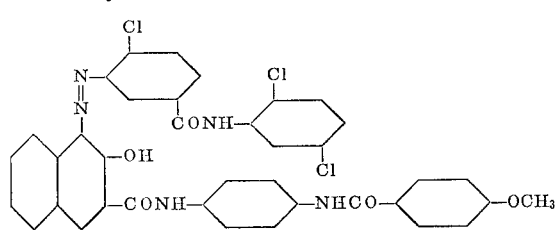

References Cited
UNITED STATES PATENTS
3,219,655   11/1965   Ranco _____ 260—203

CHARLES B. PARKER, *Primary Examiner.*
D. M. PAPUGA, *Assistant Examiner.*